(No Model.)
E. A. UEHLING.
TREATING MOLTEN METAL.
No. 543,115. Patented July 23, 1895.
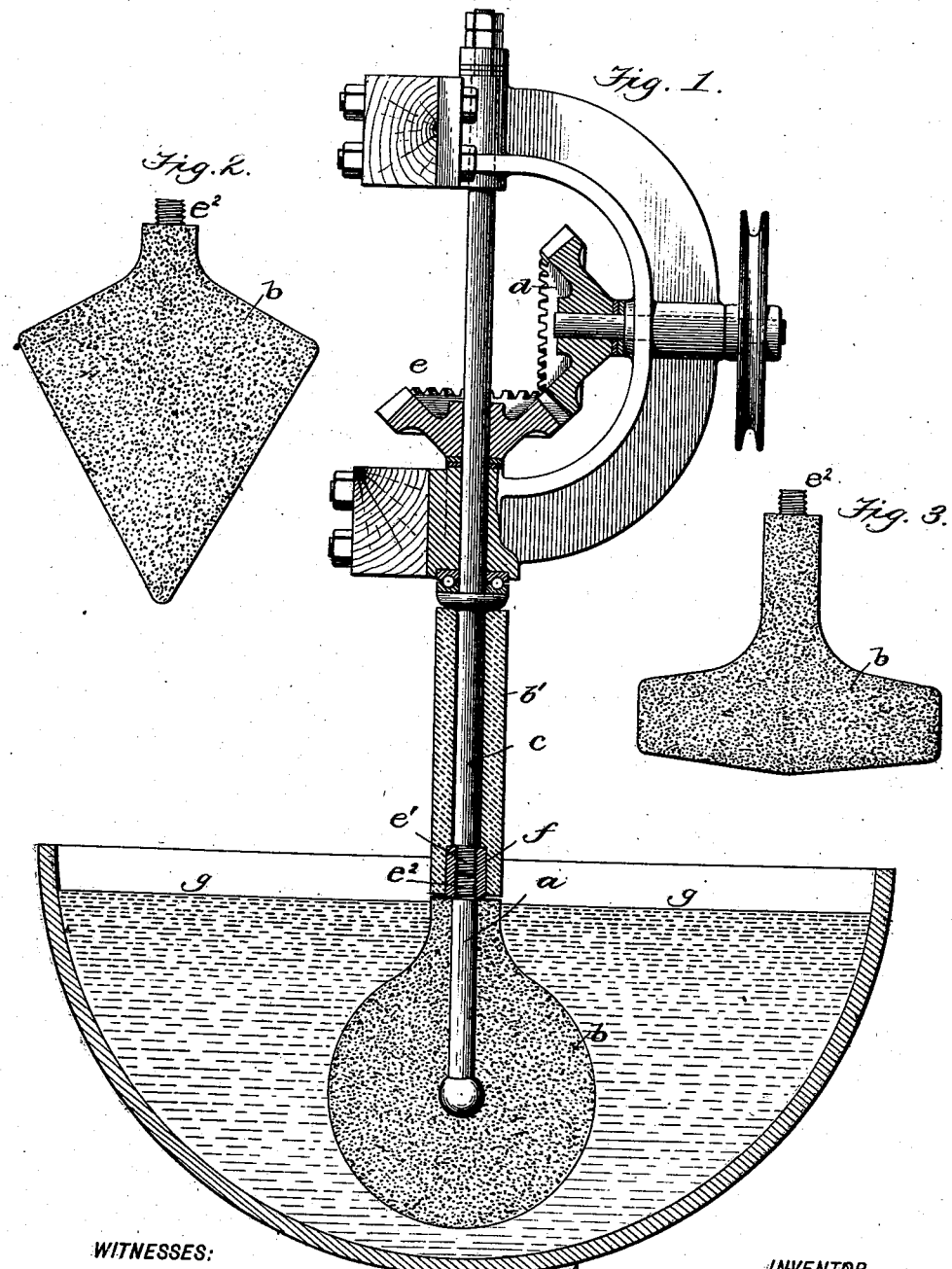

UNITED STATES PATENT OFFICE.

EDWARD A. UEHLING, OF BIRMINGHAM, ALABAMA.

TREATING MOLTEN METAL.

SPECIFICATION forming part of Letters Patent No. 543,115, dated July 23, 1895.

Application filed October 6, 1894. Serial No. 525,074. (No specimens.)

*To all whom it may concern:*

Be it known that I, EDWARD A. UEHLING, a citizen of the United States, residing at Birmingham, in the county of Jefferson and State of Alabama, have invented a new and useful Improvement in Treating Molten Metal, of which the following is a specification.

My invention relates to the treatment of molten metal by reagents for the purpose of purifying and rendering it more homogeneous, changing its chemical character and hence its physical properties.

For this purpose my invention consists in a novel process and in novel parts and combinations of parts in an apparatus for carrying such process into effect, as I will now proceed to describe, and to particularly point out in the claims concluding this specification.

According to the nature of the elements of which the revolving bodies are composed and the end to be effected these bodies are assimilated by the molten metal, or absorb from the same injurious elements, forming a slag, which separates by gravity from the body of the metal, rising to the top, where it can be removed. For example, if the revolving body or bodies are composed of carbon, and the molten metal which is agitated by them is deficient in that element, it will be absorbed and assimilated by the metal. If the revolving body is composed of silicon, manganese, or aluminum these elements will first satisfy their affinity for oxygen and the excess will be assimilated by the metal. Manganese has in addition to its affinity for oxygen also a great attraction for sulphur and is very efficient in separating this most injurious element from the metal thus treated. If the revolving body is composed of oxide of iron in connection with other basic material the silicon will be removed from the metal bath, and under favorable circumstances also the phosphorus.

The above effects are very thoroughly realized in consequence of the rotation of the bodies composed of the elements with which the metal is to be treated by my invention.

It is by no means new to treat metal, especially iron and steel, in the molten condition by adding thereto the very ingredients or reagents I have named above and many others which might be mentioned; but the manner of doing it has either been crude and wasteful or difficult to carry into effect. The treating operations in actual use either do not agitate the molten mass at all, and therefore cannot with certainty produce a homogeneous product, or the agitation is done subsequent to the introduction of the ingredients and almost universally by manual labor, which is of the severest nature.

In my invention the treatment and agitation occur simultaneously, are positive and very thorough, and take place without loss of metal or the treating elements. The desired results can therefore be very closely approximated. To accomplish this I form or mold or compact the ingredients or reagents with which the molten metal is to be treated into bodies or solids of revolution of any desired size and shape—such as a sphere, cylinder, disk, cone, &c.—which is suspended by suitable means and caused to be rapidly rotated or agitated in a suspended position within the body of the molten metal, augmenting thereby the dissolving and absorbing action of the metal on the agitating body, which is thus caused to be very rapidly worn away, and the constituents thereof are thereby uniformly mixed and assimilated with the metal, producing the desired effect and giving it a homogeneous character.

For carrying my invention into practice and effecting the results stated, I have illustrated in the accompanying drawings one form of apparatus by which the body of reagents or chemicals having the form of a solid of rotation is suspended in position to be rotated as a stirring body within a ladle or receptacle containing molten metal. It will, however, be understood that my invention is not limited to any particular form of suspending and operating carrier for giving the revolving motion to the chemical body so long as the ingredients or reagents forming such body, to be brought in contact with the metal, are suspended therein as a dissolving body revoluble on its axis of rotation and having the function of a stirrer while giving off its constituents in the process of treating iron for the purpose stated.

In the drawings, Figure 1 is a vertical section of a single carrier for suspending, immersing, and operating the body of the chemical ingredients or reagents within the molten body of metal, to dissolve and assimilate the chemicals therewith, and Figs. 2 and 3 show different forms of bodies into which the chemical ingredients may be compacted or molded upon an attaching device or core.

The chemical ingredients, having been properly mixed in plastic condition, are molded or compacted in any desired proportions, form, and size, preferably upon a core or stem $a$, as a means for attaching the molded body $b$ to any suitable suspending carrier, which may be a spindle $c$, constructed for being itself suspended by a rotating device. In the drawings such rotating device consists of a power-driven gear $d$, engaging a gear $e$ on the suspending spindle, whereby the latter is rapidly rotated with its body of chemical ingredients immersed within the molten metal. The chemical ingredients molded upon an attaching stem, as stated, form a new article of manufacture, and for this purpose the stem terminates outside of the body in a screw $e^2$, whereby it may be screwed into a corresponding screw-socket $f$ in the lower end of the suspending spindle. Any other suitable means for such attachment may be provided that will give a rigid connection of the chemical body and spindle, so as to hold the body firmly while being rotated within the body of the molten metal. This construction gives the advantage of allowing the attaching core to be conveniently removed from the spindle when the body of the ingredients upon the core has been dissolved and absorbed by the metal and another body of the chemical ingredients rigidly connected to the spindle. In this way the suspending and rotating device may be supplied with bodies of the chemical ingredients to be used in the treatment of molten metal.

The metal in a fluid condition, which the line $g$ in Fig. 1 may represent, may be treated in any suitable receptacle—such as a furnace-hearth, ladle, or crucible—and it will be understood that it may not always be the object of the treatment to add desirable chemical ingredients to the metal or to increase the quantity of the chemical constituents already contained in the metal.

The treatment in the way and by the means stated may have for its object the removal from the metal of injurious elements. It may be desirable to increase the percentage of carbon in a bath of metal. In such case the body or bodies for effecting such an addition are composed of carbonaceous substances and are made of such weight as to impart to the metal the exact quantity of the carbon desired by the rotation and agitation of such body within the metal. Other chemical elements may be incorporated in the metal in the same way, and in this way a bath of molten metal may be purified. If oxygen and other gases are to be removed, the rotating bodies will be composed of alloys of manganese, silicon, or aluminum. If silicon is to be removed, these bodies are formed of basic material, principally sesquioxide of iron. To remove sulphur from the metal ferro-manganese would be used to form the removing agent. Phosphorus is removed by making the dissoluble bodies of basic material containing a certain percentage of oxide of iron and carrying on the treatment in a basic-lined receptacle for the metal. These examples refer more particularly to the purification, &c., of iron and steel; but it is evident that the same treatment and means are applicable to the purification, &c., of any metal while in a molten condition by forming the agitating bodies of the chemicals suitable for the desired purpose. This treatment is carried on immediately after the metal is received into the receptacle, and while I have shown a single body of the molded chemicals suspended for rotation within the metal bath, yet it is obvious that provision may be made for suspending and operating a series of such bodies.

The prepared chemical bodies are immersed into the body of the metal, or such bodies may be held suspended within the crucible or other receptacle and set in motion while the metal is being run into such receptacle; but in either case the chemical bodies have no contact or movement upon the bottom walls of the receptacle and therefore cannot injuriously effect the lining thereof. The cohesive consistency of the molded body need only be such as to maintain its form under the gradual dissolving and frictional action of the molten metal. It is important to notice that this dissolving action is due to the absorbing action upon the body of chemicals and is rendered uniform upon the surface of the chemical body, so that the wear thereof is made equal throughout its surface until it is worn away to its suspending core and there is nothing lost.

My invention can be used with a fixed or with a movable hearth, ladle, or crucible for containing the molten metal, or the dissolving bodies may be adjustably suspended; in fact, my invention, as an appliance used in the treatment of molten metal with chemical constituents, can be set up and operated as such independent of any fixed connection with or construction of the receptacle containing the molten metal.

It is also important to notice that my invention provides chemical bodies composed of compositions suited for the desired treatment of molten metal in the exact proportions required for such treatment, and in a condition for use as a complete thing, having the means whereby it can be rigidly suspended from an operating carrier, which exposes the entire surface of such chemical body to the dissolving action of the molten metal. This gives the advantage of making and storing such bodies of different compositions as articles which may be sold to the trade for use with any suitable suspending and operating contrivance in the treatment of molten metal.

I prefer that the suspended position of the chemical body shall be such as to entirely immerse it in the molten metal within which its rotation causes it to give off a portion throughout its surface and equally distribute it by the absorbing action of the metal. As such immersion will necessarily include to a greater or less extent the attaching part or stem of the body and its revolving spindle, which would thereby become coated or clogged by the metal and render it impossible to renew the bodies from time to time upon the suspending spindle, and particularly by the screw-joint connection thereof shown, I provide the spindle with a sleeve of refractory material, so as to join the attaching end of the body and inclose and form a covering protection for the joint connection and for the spindle, as shown in the drawings. This protection, it will be seen, keeps the socket of the spindle free for the removal and renewal of the bodies of the reagents.

I claim—

1. The process herein described of treating molten metal with suitable re-agents, which consists in molding or compacting the re-agents into a body having a form suitable for rotating about an axis, submerging said body into the molten metal and revolving the said body on its axis of rotation whereby it is dissolved for the purpose stated.

2. For use in the treatment of molten metal, a body composed of the re-agents employed in such treatment having the form of a solid of revolution molded or compacted about a core or hanger whose end terminates in a rigid detachable coupling adapted for attachment with a mechanically rotating device.

3. For the treatment of molten metal, a body having a form suitable for rotating about an axis molded or compacted of the re-agents employed in said treatment about a core, a suspending device upon which said body is molded, and suitable means for mechanically revolubly operating said suspending device, substantially as described.

4. The process herein described of treating molten metal with suitable re-agents, which consists in molding or compacting the re-agents into a body having a form suitable for rotating about an axis and suspending, submerging and revolving said body on its axis of rotation within the molten metal to effect its dissolving and assimilation therewith.

5. For treating molten metal, the combination, with a body composed of the re-agents employed in effecting such treatment having the form of a solid of revolution and molded or compacted about a core or hanger, of a suitably suspended shaft rigidly connecting said body, and suitable means for revolving said shaft with its body of re-agents immersed within the molten metal, substantially as described.

6. For treating molten metal, the combination with a body composed of the re-agents employed in effecting such treatment having the form of a solid of revolution and molded upon a central core terminating in a screw-stem external to said body, of a suitably suspended shaft having a screw socket for engaging the screw-stem of said body-core, and suitable means for revolving said shaft and its suspended body to effect the assimilation of the latter uniformly within the body of the molten metal.

7. For treating molten metal, a body having the form of a solid of revolution compacted or molded of the re-agents employed in effecting such treatment, rigidly mounted on a mechanically revoluble shaft for operation in suspension within the body of the molten metal.

8. For treating molten metal, the combination with a body composed of the re-agents employed in effecting such treatment having a form suitable for rotating about an axis and molded about a core provided with suitable means for rigidly connecting said body, of a properly mounted shaft, with which said rigid connection is made, provided with a sleeve of refractory material inclosing and protecting such connection, and suitable means for revolving said shaft with its body of re-agents immersed within the molten metal, whereby the re-agent is dissolved.

9. The herein described process of treating molten metal with suitable re-agents, which consists in reducing the re-agents into a mastic, molding or compacting the same into a body, submerging said body into the body of the metal and dissolving the said immersed body of re-agents by the revolution of one of said bodies on its axis of rotation.

EDWARD A. UEHLING.

Witnesses:
A. H. GEOHEGAN,
CHAS. F. L. MEISSNER, Jr.